L. B. BUCHANAN.
AUTOMOBILE HORN.
APPLICATION FILED DEC. 20, 1909.

971,169.

Patented Sept. 27, 1910.

Witnesses:
H. B. Davis.
D. S. Peterson.

Inventor:
Leonard B. Buchanan
by Noyes & Harriman

UNITED STATES PATENT OFFICE.

LEONARD B. BUCHANAN, OF WOBURN, MASSACHUSETTS, ASSIGNOR TO STONE AND WEBSTER, OF BOSTON, MASSACHUSETTS, A FIRM.

AUTOMOBILE-HORN.

971,169.  Specification of Letters Patent.  Patented Sept. 27, 1910.

Application filed December 20, 1909. Serial No. 534,115.

*To all whom it may concern:*

Be it known that I, LEONARD B. BUCHANAN, of Woburn, county of Middlesex, and State of Massachusetts, have invented an Improvement in Automobile-Horns, of which the following is a specification.

This invention relates to horns adapted to be used on automobiles and elsewhere for sounding a warning signal.

The invention has for its object the construction of a horn which may be operated by means arranged in proximity to the steering wheel of an automobile, or other point more or less remote from the horn, and its operation may be continued by a single movement of the operating-device as long as desired, so that in case the device is used on an automobile, the chauffeur may operate the horn without removing his hands from the steering-wheel.

The invention also has for its object the employment as a sounding-device for the horn what I herein term a snapper-plate, which is arranged in conjunction with a resonator, as, for instance, at the apex of a horn or thereabout, and which, when vibrated is adapted to produce sounds of considerable volume and intensity, and to provide a vibrating actuating-lever for said snapper-plate, the movements of which are controlled by an operating-device adapted to be arranged more or less remote from the horn.

The invention also has for its object the employment of electrical means for continuously vibrating the actuating-lever of the snapper-plate.

Figure 1:
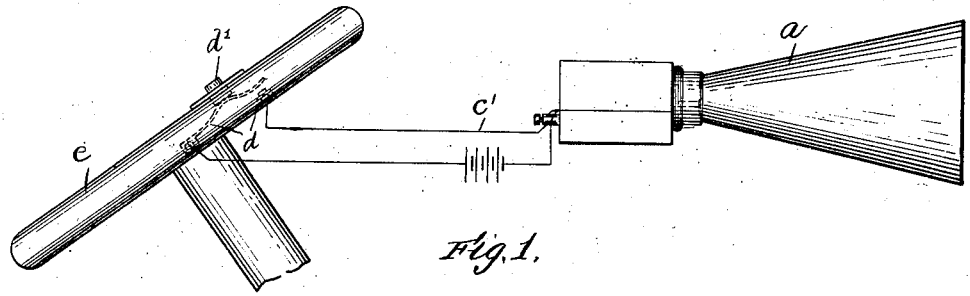
Figure 2:
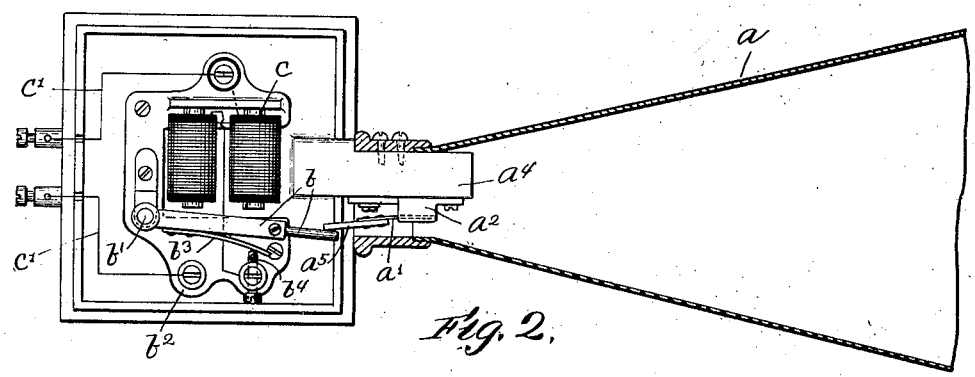
Figure 3:
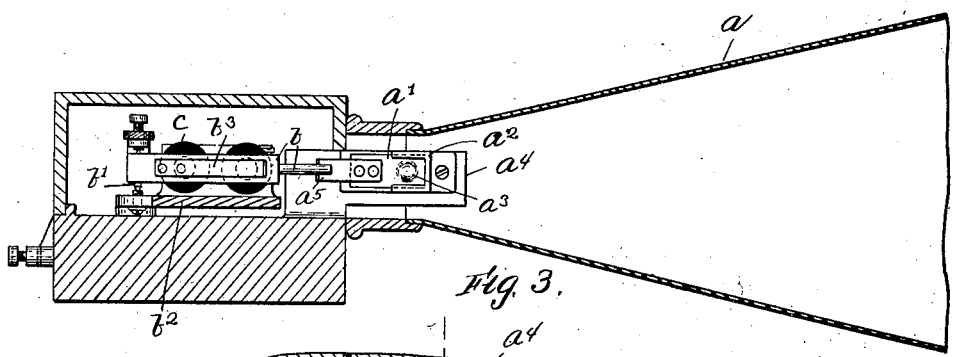
Figure 4:
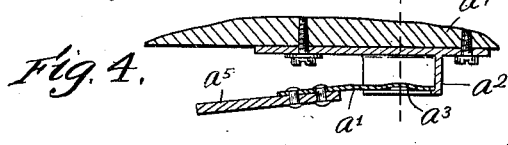
Figure 6:
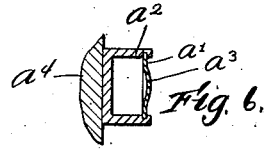
Figure 5:
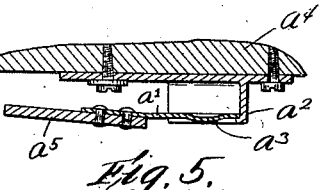

Figure 1 is a side view of the automobile horn embodying this invention, the operating-device therefor being arranged in proximity to the steering-wheel of an automobile. Fig. 2 is an enlarged horizontal sectional view, the snapper-plate being shown in side elevation, and the electrical operating-means therefor being shown in plan view. Fig. 3 is an enlarged vertical sectional view. Figs. 4, 5, and 6 are sectional details of the snapper-plate to be referred to.

$a$ represents the resonator, herein shown as a horn, which may be of any suitable shape, size and material. In conjunction with said resonator, as, for instance, at the apex of the horn or thereabout a snapper-plate $a'$ is arranged, see Figs. 4, 5 and 6. Said plate consists of a thin, flat metallic plate, supported at its edges at one end only by a suitable frame $a^2$, its opposite end being free, and said plate is formed with an indentation $a^3$. Such a plate, when made of elastic metal, is adapted by reversing the indented portion thereof, to produce short, sharp sounds of considerable volume and intensity. The indented portion thereof is reversed, as shown in Figs. 4 and 5, by pressure applied to the free end of the plate, and is permitted to assume its normal position when pressure thereupon is relieved; the sound being produced by both movements of the indented portion of the plate. The frame $a^2$ bearing said snapper-plate is arranged on a block $a^4$, or other form of support, to which the horn is attached. As a means of vibrating said snapper-plate continuously, a vibrating actuating-lever is employed. $b$ represents said actuating-lever. It is pivoted at $b'$ to a base-plate, $b^2$, and its free end extends over an extension-piece $a^5$, secured to the free end of the snapper-plate, or, it may extend directly over the free end of said plate, the extension-piece being omitted. Said actuating-lever $b$ is here shown as a circuit-making-and-breaking-lever, it having a contact-pen $b^3$ attached to it, the free end of which is movable into and out of engagement with a contact-point $b^4$, supported by the plate $b^2$.

$c$ represents an electro-magnet supported on the base-plate $b^2$, which is arranged at one side of the actuating-lever $b$, and said actuating-lever is constructed and arranged to serve as the armature of said electro-magnet, and when the circuit $c'$ of said electro-magnet is closed, said armature is caused to vibrate repeatedly, like unto the operation of an ordinary vibrating electric-bell, the circuit $c'$ being repeatedly opened when the contact-pen $b^3$ disengages the contact-point $b^4$. The circuit $c'$ extends to and includes a circuit-closing device, represented at $d$, which consists of a simple form of make-and-break element having a finger-engaging member $d'$ by which it is operated.

When the device is used on an automobile the horn may be located wherever desired, and the circuit-operating device $d$ may be arranged on or in proximity to the steering-wheel $e$ of the automobile, so that while the chauffeur holds the steering-wheel he can reach the circuit-operating device and close the circuit and thereby operate the horn.

I do not limit my invention to the particular means here shown, or to the electrical means for operating the snapper-plate, as it is obvious that the actuating-lever $b$ may be continuously vibrated by other means, and the snapper-plate operated to produce sounds in quick succession.

I claim:

1. The combination with a resonator, of a vibratory snapper-plate arranged in conjunction therewith, and a vibratory actuating-lever for said snapper-plate, substantially as described.

2. The combination with a resonator, of a vibratory snapper-plate arranged in conjunction therewith, a vibratory actuating-lever, and means for operating said actuating lever, substantially as described.

3. The combination with a resonator, of a vibratory snapper-plate arranged in conjunction therewith, a vibratory actuating-lever, and means for operating said actuating-lever, and an operating-device for said actuating-means, substantially as described.

4. The combination with a resonator, of a vibratory snapper-plate arranged in conjunction therewith, a vibratory actuating-lever, means for operating said actuating-lever, an operating-device for said actuating-means disposed at a distance therefrom and connected therewith, substantially as described.

5. The combination with a resonator, of a vibratory snapper-plate arranged in conjunction therewith, a vibratory actuating-lever, and means for operating said actuating-lever from a distant point, substantially as described.

6. The combination with a resonator, of a vibratory snapper-plate arranged in conjunction therewith, a vibratory actuating-lever, and means for repeatedly vibrating said actuating-lever, and a controlling device for said vibrating means located at a distant point, substantially as described.

7. The combination with a resonator, of a vibratory snapper-plate arranged in conjunction therewith, a vibratory actuating-lever means for vibrating said actuating-lever, and a controlling device for said vibrating means, which, by a single continuous operation, causes said actuating-lever to repeatedly vibrate, substantially as described.

8. The combination with a resonator, of a vibratory snapper-plate arranged in conjunction therewith, and removably attached to its support, and a vibratory actuating-lever for said snapper-plate, substantially as described.

In testimony whereof, I have signed my name to this specification, in the presence of two subscribing witnesses.

LEONARD B. BUCHANAN.

Witnesses:
B. J. NOYES,
H. B. DAVIS.